US007215604B2

(12) United States Patent
Haas et al.

(10) Patent No.: US 7,215,604 B2
(45) Date of Patent: May 8, 2007

(54) TIME INDICATOR ASSEMBLY

(75) Inventors: David J. Haas, Suffern, NY (US); Robert J. Holt, Cornwall, NY (US)

(73) Assignee: Brady Worldwide, Inc., Milwaukee, WI (US)

( * ) Notice: Subject to any disclaimer, the term of this patent is extended or adjusted under 35 U.S.C. 154(b) by 103 days.

(21) Appl. No.: 10/819,791

(22) Filed: Apr. 7, 2004

(65) Prior Publication Data

US 2005/0226101 A1 Oct. 13, 2005

(51) Int. Cl.
*G04B 17/00* (2006.01)
*G01N 31/32* (2006.01)

(52) U.S. Cl. ........................ 368/327; 368/114; 116/200

(58) Field of Classification Search ................ 368/327, 368/62, 114, 121; 116/200, 207, 219, 308
See application file for complete search history.

(56) References Cited

U.S. PATENT DOCUMENTS 3,854,229 A 12/1974 Morgan
4,212,153 A 7/1980 Kydonieus et al.
4,903,254 A * 2/1990 Haas .......................... 368/327
5,058,088 A 10/1991 Haas et al.
5,107,470 A * 4/1992 Pedicano et al. ........... 368/327
5,161,687 A * 11/1992 Kornell et al. .............. 206/447
5,446,705 A 8/1995 Haas et al.
5,633,836 A * 5/1997 Langer et al. .............. 368/327
5,715,215 A 2/1998 Haas et al.
5,719,828 A 2/1998 Haas et al.
5,930,206 A * 7/1999 Haas et al. ................. 368/327
5,957,458 A 9/1999 Haas et al.
5,974,003 A 10/1999 Pedicano et al.
6,017,408 A 1/2000 Rogers et al.
6,452,873 B1 * 9/2002 Holt et al. .................. 368/327
2004/0013839 A1 1/2004 Ko et al.

FOREIGN PATENT DOCUMENTS

WO WO 03/077227 A2 9/2003

* cited by examiner

*Primary Examiner*—Vit W. Miska
*Assistant Examiner*—Thanh S. Phan
(74) *Attorney, Agent, or Firm*—Quarles & Brady LLP

(57) ABSTRACT

A time indicator assembly including a front part and a back part is disclosed that can easily pass through a printer. The time indicator assembly includes a base substrate forming at least part of the back part having a first surface and a second surface extending between edges. A migrating ink is applied over a portion of the first surface of the base substrate, and a release sheet overlies the migrating ink to prevent migration of the migrating ink toward the front part. In one embodiment, an adhesive is applied over the release sheet and onto the base substrate adjacent at least two of the base substrate edges. The adhesive joins a cover substrate forming at least part of the front part to the base substrate over at least a portion of the release sheet and along the at least two of the base substrate edges. Upon removal of the release sheet, the migrating ink migrates through the adhesive to form an image in the cover substrate. In another embodiment a lift strip is formed in at least one of the front part and back part for easily separating the front part and back part to expose and remove the release sheet.

20 Claims, 3 Drawing Sheets

TIME INDICATOR ASSEMBLY

CROSS REFERENCES TO RELATED APPLICATIONS

Not Applicable.

STATEMENT REGARDING FEDERALLY SPONSORED RESEARCH

Not Applicable.

TECHNICAL FIELD

This invention relates to time indicator assemblies, and in particular to a time indicator assembly including migrating ink that migrates through an opaque layer of material forming part of the assembly to produce a viewable image after a period of time.

DESCRIPTION OF THE BACKGROUND ART

A known time indicator assembly 1 including migrating ink 2, such as shown in FIG. 1, produces a visible image after a period of time. The migrating ink 2 is applied to a base material 3, such as by printing, to form a back part 4 of the assembly 1. The back part 4 is adhesively joined with a front part 5 formed from one or more layers 7, 8, 9 of opaque and/or transparent material or coatings by an adhesive 6 to form and activate the assembly 1. Over a period of time, the migrating ink 2 of the activated assembly 1 migrates through the adhesive 6 to form a viewable image. The front part 5 and the back part 4 are not joined together until activation of the time indicator assembly 1 is desired. As a result, properly aligning the front part 5 and back part 4 to form and activate the assembly can be difficult.

This problem is solved by a time indicator assembly having a front part and a back part adhesively joined at one edge, such as disclosed in U.S. Pat. Nos. 5,107,470 and 5,974,003 which are fully incorporated herein by reference. These patents disclose an assembly having a front part and a back part similar to the time indicator assembly shown in FIG. 1. The back part includes migrating ink applied to a base material, and the front part includes one or more opaque coatings or layers. In order to ensure the front part and the back part are properly aligned, an edge of the front part is adhesively joined to the back part adjacent to the migrating ink. Prior to activation, a release liner interposed between the migrating ink and the front part prevents the migrating ink from contacting the front part and migrating through the opaque layers. When a user wishes to activate the assembly and initiate migration of the ink, the release liner is removed and the portion of the front part overlying the migrating ink is joined to the back part.

Since only one edge of the front part is joined to the back part, the front part is free to flop around. The floppy front part causes havoc when printing on outer surfaces of the assembly. Moreover, in one embodiment disclosed in the '470 patent, the release liner is folded over to form a pull tab for removing the release liner and activating the assembly. Prior to activation of the assembly, this folded release liner forms an assembly having an uneven thickness which causes further problems when attempting to print on an outer surface of the assembly.

SUMMARY OF THE INVENTION

The present invention provides a time indicator assembly having a front part and a back part that can easily pass through a printer. The assembly includes a base substrate forming at least part of the back part having a first surface and a second surface extending between edges. A migrating ink is applied over a portion of the first surface of the base substrate, and a release sheet overlies the migrating ink to prevent migration of the migrating ink toward the front part. In one embodiment, an adhesive is applied over the release sheet and onto the base substrate. The adhesive joins a cover substrate forming at least part of the front part to the base substrate over at least a portion of the release sheet along at least two of the front part edges to prevent the cover substrate from flopping around. Upon removal of the release sheet, the migrating ink migrates through the adhesive to form the image in the cover substrate. In another embodiment a lift strip is formed in at least one of the front part and the back part for easily separating the front part and the back part to expose and remove the release sheet.

A general objective of the present invention is to provide a time indicator assembly having a non-floppy front part. This objective is accomplished by securing the front part to at least two edges of the back part.

Another objective of the present invention is to provide a time indicator assembly having a front part that is easily separated from the back part to expose a release liner for easy removal. This objective is accomplished in one embodiment of the present invention by providing a lift strip in the one of the front part and back part.

The foregoing and other objectives and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DETAILED DESCRIPTION OF THE PREFERRED EMBODIMENTS

Figure 1:
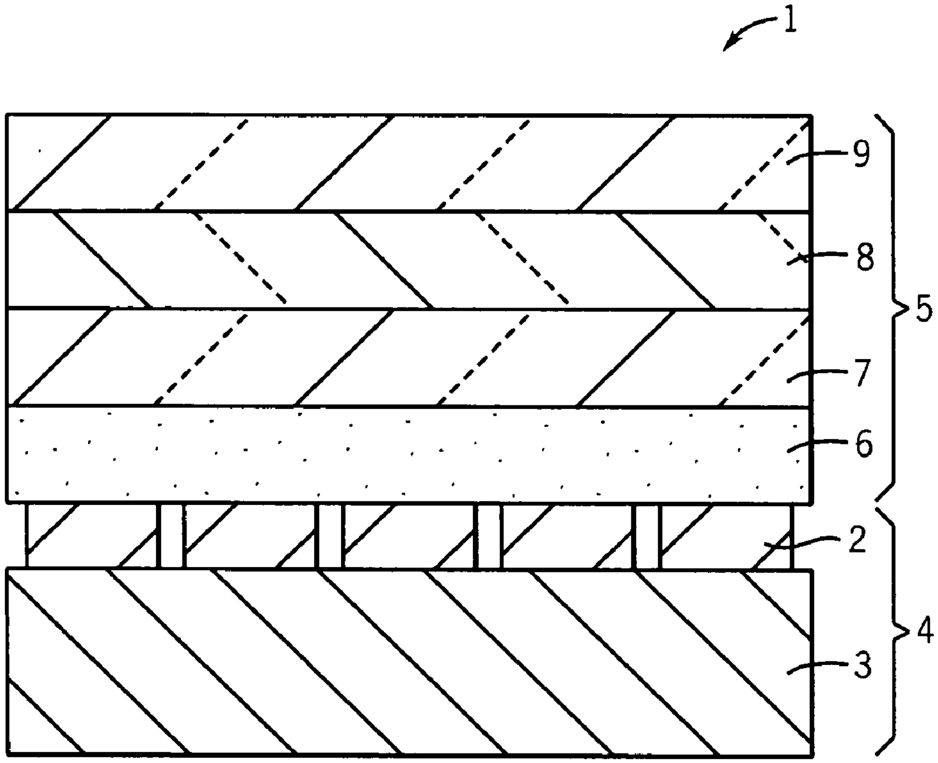
FIG. 1 PRIOR ART
FIG. 1 is a cross sectional view of a prior art time indicator assembly formed from two independent parts.
Figure 2:
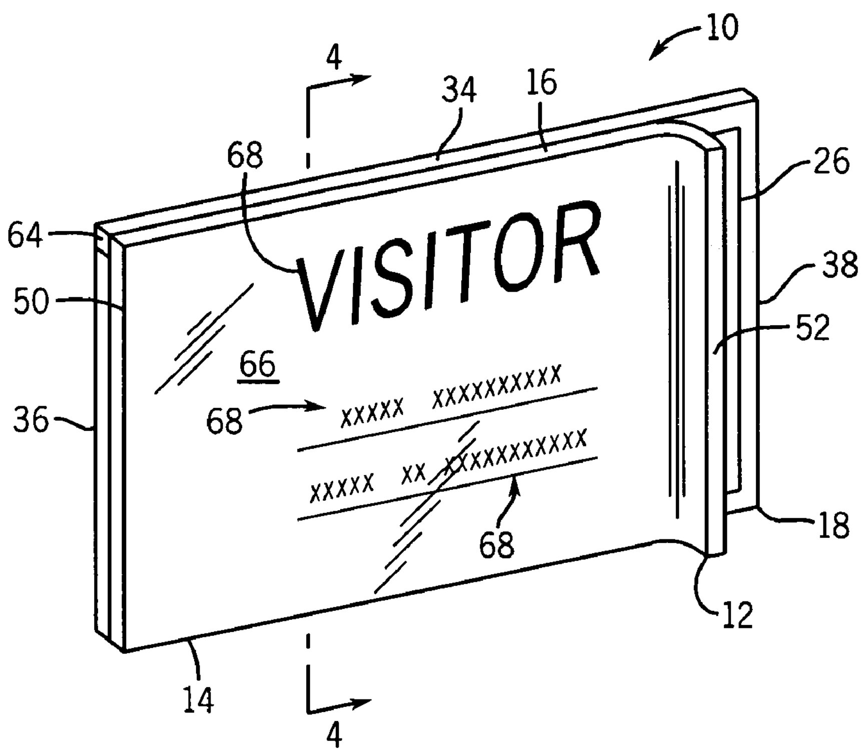
FIG. 2 is a perspective view of a time indicator assembly incorporating the present invention in the form of a badge prior to activation.
Figure 3:
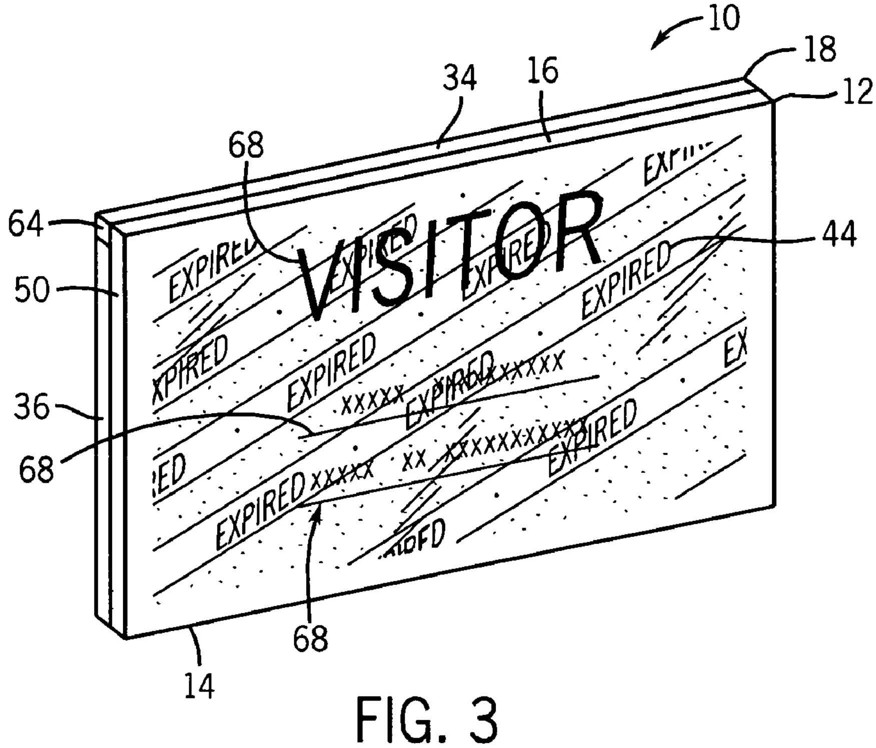
FIG. 3 is a perspective view of the time indicator assembly of FIG. 2 after activation.
Figure 4:
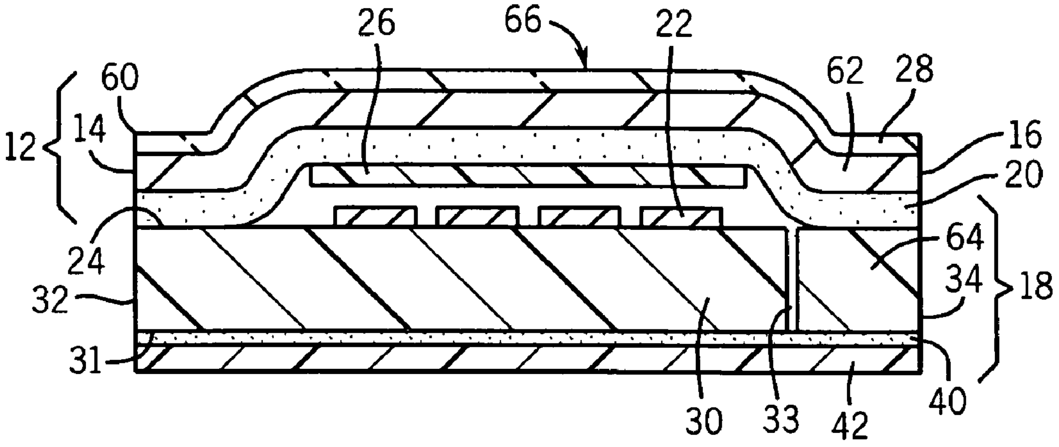
FIG. 4 is a sectional view along line 4—4 of FIG. 2.

A time indicator assembly 10 in the form of a badge is shown in FIGS. 2–4, and includes a front part 12 having at least two edges 14, 16 fixed relative to a back part 18 by a pressure sensitive adhesive 20. Migrating ink 22 applied to a top surface 24 of the back part 18 is separated from the adhesive 20 by a release sheet 26. The time indicator assembly 10 is activated by removing the release sheet 26 and pressing the front part 12 and back part 18 together. Upon activation, the migrating ink 22 migrates through the adhesive 20 until it is visible through a transparent outer layer 28 forming part of the front part 12. Advantageously, fixing at least two edges of the front part 12 relative to the back part 18 prevents the front part 12 from flopping prior to use and when the time indicator assembly 10 passes through a printer that prints indicia on an exposed surface 66 of the time indicator assembly 10.

The back part 18 includes a base substrate 30 upon which the migrating ink 22 is printed. The base substrate 30 has a periphery defined by the edges 32, 34, 36, 38, and includes the top surface 24 of the back part 18 and a bottom surface 31. In the embodiment disclosed herein, the base substrate 30 is rectangular having four edges 32, 34, 36, 38, however, the base substrate 30 can have any shape, such as a circle wherein each edge is defined by an arc of approximately 90 degrees. The base substrate 30 can be formed from one or more layers of material, such as paper, cardboard, plastic, foil, and the like, without departing from the scope of the invention. Moreover, the back part 18 can include a pressure sensitive adhesive 40 applied to the bottom surface 31 of the base substrate 30 and covered with a release liner 42 to form a badge useable as a name tag that can releasebly adhere to a user's clothing.

In the embodiment disclosed in FIGS. 2–4, the migrating ink 22 is applied to a portion of the back part top surface 24 and spaced inwardly from at least two of the base substrate edges 32, 34, 36, 38. The migrating ink 22 defines an image 44, or other indicia, such as alphanumeric characters, symbols, graphic designs, stripes, and the like. The migrating ink 22 can be any known ink which upon contact with the adhesive 20 migrates therethrough to form the image 44 in the front part 12, such as disclosed in U.S. Pat. No. 4,212,153 which is fully incorporated herein by reference. Forming an image 44 in the front part 12 or cover substrate 60 does not require the migrating ink 22 to migrate into any part of the front part 12 or cover substrate 60. The image 44 must, however, be at least viewable through the front part 12 or cover substrate 60 to be formed in the front part 12 or cover substrate 60. Of course, non-migrating ink can be applied to the base substrate 30 to hide the image 44 formed by the migrating ink 22, and/or reduce the contrast between the background color seen through the front part 12 and the image 44, without departing from the scope of the invention.

The release sheet 26 overlies the migrating ink 22 and separates the migrating ink 22 from the adhesive 20 to prevent activation of the time indicator assembly 10. The release sheet 26 can be formed from any known material impervious to the migrating ink 22 and releasable from the adhesive 20, such as coated paper, foil, and the like, without departing from the scope of the claims.

The adhesive 20 overlies the release sheet 26 and base substrate 30 to form an adhesive layer that fixes the front part 12 relative to the base substrate 30. The adhesive 20 can be any adhesive known in the art, such as a rubber or acrylic based pressure sensitive adhesive. In one embodiment, the adhesive 20 includes an opaqueing agent, such as titanium dioxide blended in a polymer mixture, to form an opaque adhesive which obscures the migrating ink 22 from view as the migrating ink 22 migrates therethrough. Of course, the adhesive 20 can be clear and an opaque layer forming part of the front part 12 can be provided to obscure the migrating ink 22 from view as the migrating ink 22 migrates through the adhesive 20 and opaque layer following activation of the time indicator assembly 10.

The adhesive 20 is applied over the release sheet 26 and onto the base substrate 30 adjacent at least two of the front part edges 14, 16 to fix the two edges 14, 16 of the front part 12 relative to the two edges 32, 34 of the base substrate 30. The edges 14, 16 of the front part 12 fixed relative to the base substrate 30 can be opposing edges, such as edges 14, 16, or adjacent edges, such as edges 14, 50, without departing from the scope of the invention. Advantageously, by fixing at least two edges of the front part 12 relative to the base substrate 30, the front part 12 is prevented from flopping around which allows the time indicator assembly 10 to pass through a printer without jamming the printer. Advantageously, the adhesive 20 can be spaced inwardly from at least one edge of the front part 12 to allow a user to slip a fingernail, or other object, between the front part 12 and base substrate 30 to separate the front part 12 from the base substrate 30 to expose and remove the release sheet 26.

In the embodiment disclosed herein, the front part 12 is bounded by the edges 14, 16 and edges 50, 52 which coincide with edges of a cover substrate 60 forming the front part 12. The cover substrate 60 is formed from an inner layer 62 and the outer layer 28 of material which overlies and covers the migrating ink 22. The cover substrate 60 is joined to the base substrate 30 and the release sheet 26 by the adhesive 20. Although only two layers 62, 28 are disclosed, any number of layers can be used to form the cover substrate 60 without departing from the scope of the invention.

The inner layer 62 can be formed from an opaque material including a non-porous polymer containing titanium oxide, or other opaqeuing agent, through which the migrating ink 22 can migrate. Of course, if the adhesive 20 is opaque, the opaque inner layer 62 can be eliminated, or be substituted with a transparent layer, such as a non-porous polymer including plasticized PVC (polyvinyl chloride), semiplasticized PVC, acrylics, polyurethanes and hytrel, and the like, without departing from the scope of the invention. Moreover, any number of inner layers can be provided without departing from the scope of the invention.

The outer layer 28 is transparent and impervious to the migrating ink 22, such as a clear inert acetate or polyester film, to allow a user to see the image 44 formed by the migrating ink 22 once it has migrated through the adhesive 20 and/or opaque inner layer 62 while preventing external migrating ink from passing through the outer layer 28 from an external source of migrating ink. Preferably, ink can be applied to an outwardly facing surface 66 of the outer layer 28, such as by printing, stenciling, writing, and the like, to form indicia 68 on the outwardly facing surface 66.

A lift strip 64 is formed in the back part 18 adjacent to the migrating ink 22 by forming a cut 33 spaced inwardly from one edge 34 of the back part 18. The lift strip 64 is adhesively fixed to the front part 12, and permits a person to easily lift the front part 12 to expose and remove the release sheet 26 to activate the assembly 10. Although forming the lift strip 64 in the back part 18 is disclosed, the lift strip 64 can be formed in the front part 12 without departing from the scope of the invention.

In use, the time indicator assembly 10 including the release sheet 26 interposed between the front part 12 and back part 18 is passed through a printer for printing indicia 68 thereon. Advantageously, by securing the front part 12 and back part 18 relative to each other by fixing at least two edges 32, 34 of the base substrate 30 relative to two edges 14, 16 of the front part 12, the front part 12 cannot flop around and jam the printer. In FIG. 2, the front part edge 52 is shown rolled back from the base substrate edge 38 to show the release sheet 26 disposed therebetween.

The time indicator assembly 10 is activated by a user grasping the lift strip 64 and separating the front part 12 from the back part 18 without breaking the adhesive bond between at least one pair of adhesively bonded edges, such as edges 32, 14, to expose the release sheet 26. The release sheet 26 is removed and the front part 12 and the back part 18 are then pressed together to urge the adhesive 20 into contact with the migrating ink 22 to activate the time indicator assembly 10. Advantageously, by maintaining one pair of edges, such as edges 32, 14, together, the edges of the front part 12 and back part 18 remain aligned when pressed together.

Figure 5:
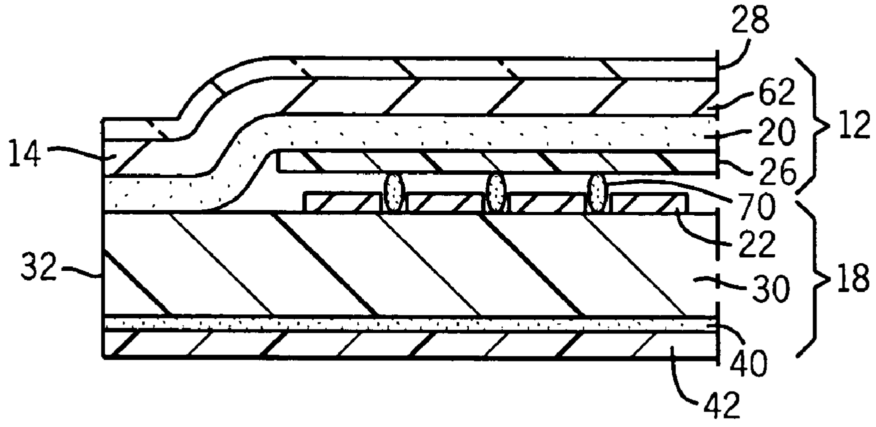
FIG. 5 is a sectional view of another embodiment of a time indicator assembly incorporating the present invention.
Figure 6:
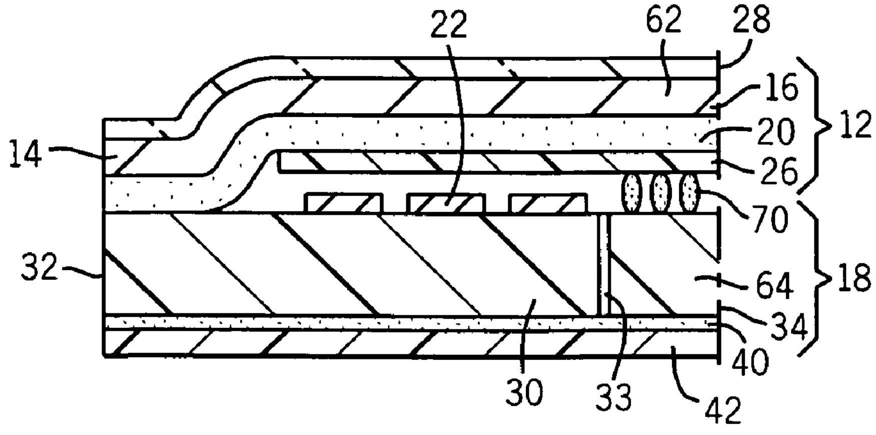
FIG. 6 is a sectional view of yet another embodiment of a time indicator assembly incorporating the present invention.

In other embodiments shown in FIGS. 5 and 6 where like components are assigned like reference numbers, an adhesive 70 can be interspersed with the migrating ink 22, such as shown in FIG. 5, or applied adjacent to the migrating ink 22, such as shown in FIG. 6, to fix the release sheet 26 relative to the back part 18 which is adhesively fixed to the front part 12 to fix at least two edges of the front part 12 relative to the back part 18. Advantageously, in the embodiment shown in FIG. 6, the lift strip 64 is adhesively fixed to the release sheet 26 which is easy to grasp for removing the release sheet 26. Advantageously, in all of the embodiments, the release sheet 26 remains flat to provide a flat surface for printing on the time indicator assembly 10, and the time indicator assembly 10 remains inert in its composite construction prior to removal of the release sheet 26. Of course, the release sheet 26 can be folded or extend past one of the edges of the time indicator assembly 10 to provide a tab for easy removal of the release sheet 26.

While there has been shown and described what is at present considered the preferred embodiment of the invention, it will be obvious to those skilled in the art that various changes and modifications can be made therein without departing from the scope of the invention defined by the appended claims.

We claim:

1. A time indicator assembly comprising:

a base substrate having a first surface and a second surface extending between edges;

a migrating ink applied over a portion of said first surface of said base substrate;

a release sheet overlying said migrating ink;

an adhesive applied over said release sheet and said base substrate; and a cover substrate joined to said base substrate by said adhesive over at least a portion of said release sheet along at least two edges of said cover substrate to prevent said cover substrate from flopping, wherein upon removal of said release sheet, said migrating ink migrates through said adhesive to form an image in said cover substrate.

2. The time indicator assembly as in claim 1, in which said cover substrate includes a transparent top layer.

3. The time indicator assembly as in claim 1, in which said cover substrate is transparent.

4. The time indicator assembly as in claim 1, in which said adhesive is opaque.

5. The time indicator assembly as in claim 1, in which a cut spaced from at least one of said base substrate edges is formed in at least one of said base substrate and said cover substrate to form a lift strip between said cut and said at least one of said base substrate edges for exposing and removing said release sheet.

6. The time indicator assembly as in claim 5, in which said release sheet is adhesively fixed to said lift strip.

7. The time indicator assembly as in claim 1, in which said release sheet is adhesively fixed relative to said base substrate by an adhesive interspersed with said migrating ink.

8. The time indicator assembly as in claim 1, in which said adhesive is applied onto said base substrate adjacent said at least two cover substrate edges to adhesively fix said at least two cover substrate edges to said base substrate.

9. A method of assembling a time indicator assembly; said method comprising:

applying a migrating ink onto a portion of a top surface of a base substrate;

laying a release sheet over said migrating ink;

applying an adhesive onto a cover substrate adjacent at least two edges of said cover substrate; and fixing said cover substrate relative to said base substrate, wherein said adhesive bonds said cover substrate to said base substrate over said release sheet along said at least two edges of said cover substrate to prevent said cover substrate from flopping.

10. The method as in claim 9, including forming a cut in said base substrate spaced inwardly from one of said at least two base substrate edges to form a lift strip.

11. A time indicator assembly comprising:

a base substrate having a first surface and a second surface extending between edges;

a migrating ink applied over a portion of said first surface of said base substrate;

a release sheet overlying said migrating ink;

an adhesive applied over said release sheet and onto said base substrate;

a cover substrate joined to said base substrate by said adhesive, wherein upon removal of said release sheet, said migrating ink migrates through said adhesive to form an image in said cover substrate; and a lift strip formed in one of said base substrate and said cover substrate for exposing and removing said release sheet.

12. The time indicator assembly as in claim 11, in which said cover substrate includes a transparent top layer.

13. The time indicator assembly as in claim 11, in which said cover substrate is transparent.

14. The time indicator assembly as in claim 11, in which said adhesive is opaque.

15. The time indicator assembly as in claim 11, in which said cover substrate is adhesively joined to said base substrate over at least a portion of said release sheet along at least two of cover substrate edges.

16. The time indicator assembly as in claim 11, in which said release sheet is adhesively fixed to said lift strip.

17. The time indicator assembly as in claim 11, in which said release sheet is adhesively fixed relative to said base substrate by an adhesive interspersed with said migrating ink.

18. The time indicator assembly as in claim 15, in which said adhesive is applied onto said base substrate adjacent said at least two cover substrate edges to adhesively fix said at least two cover substrate edges to said base substrate.

19. The time indicator assembly as in claim 11, in which a cut in said one of said base substrate and said cover substrate forms said lift strip in said one of said base substrate and said cover substrate.

20. The time indicator assembly as in claim 11, in which said lift strip is joined to the other of said base substrate and said cover substrate.

* * * * *